Sept. 8, 1970     MITUO IMADA     3,527,090

DEVICE FOR MEASURING THE VELOCITY OF VEHICLE WHEELS

Filed March 22, 1968     2 Sheets-Sheet 1

*Mituo Imada* INVENTOR.

BY *George B. Oujevolk* Attorney

Sept. 8, 1970  MITUO IMADA  3,527,090
DEVICE FOR MEASURING THE VELOCITY OF VEHICLE WHEELS
Filed March 22, 1968  2 Sheets-Sheet 2

Mituo Imada
INVENTOR.

BY George B Oujielle
Attorney

United States Patent Office 3,527,090
Patented Sept. 8, 1970

3,527,090
DEVICE FOR MEASURING THE VELOCITY OF VEHICLE WHEELS
Mituo Imada, Tokyo, Japan, assignor to Iyasaka Seiki Co., Tokyo, Japan, a corporation of Japan
Filed Mar. 22, 1968, Ser. No. 715,411
Claims priority, application Japan, Mar. 23, 1967, 42/17,865
Int. Cl. G01l 5/28
U.S. Cl. 73—124
2 Claims

ABSTRACT OF THE DISCLOSURE

This measuring device includes a front, a first and a second roller provided for each of all the front and rear wheels involved in a vehicle. The device further comprises means for urging the first and second rollers onto the surface of the wheel, means for retracting the first roller from the wheel, and means for measuring the varying rotations of the second roller. The rotation of the wheel is exactly and continuously transmitted to the second roller.

---

This invention relates to a device for measuring the velocity of vehicle wheels, and more particularly to a device for measuring the deceleration of vehicle wheels caused by braking, said device being of a type adapted for the wheel driven by the vehicle engine.

The prior art device for measuring the deceleration of vehicle wheels consisted of wheel-supporting front and rear rollers so disposed on a frame as to remain in the same position. Since the wheel, when subjected to braking, was liable slightly to ride on the front roller, such motion of the wheel often caused the contact pressure between the wheel and rear roller to be varied to an appreciable extent or these members to be disengaged from each other in an extreme case.

Such variation and disengagement were also caused by the vibration of a suspension system for the wheel generated by brake shocks.

Accordingly, it was difficult for the prior art device to continuously and exactly to measure the speed of wheel rotations which might vary under the braking loads applied thereto.

An object of this invention is to provide an improved measuring device to eliminate the aforementioned drawbacks.

In an aspect of this invention, the measuring device includes a front, a first and second roller provided for each of all the front and rear wheels involved in a vehicle, the front roller being disposed under the wheel in a manner to contact the periphery thereof at the front side and the first and second rollers under the wheel in a manner to contact the periphery thereof at the rear side, means for urging the first and second rollers onto the surface of the wheel, means for retracting the first roller from the wheel, and means for measuring the varying rotations of the second roller.

In an arrangement of the invention, means for urging the first and second rollers and means for retracting the first roller may be combined into one assembly, namely, said assembly may be formed from a piston-cylinder assembly and a swinging lever rotatable around a fulcrum located at the centre. The lever is connected to the piston rod of the piston-cylinder assembly at one of its ends, and rotatably carries the first and second rollers connected thereto at the other end. The swinging lever may be assembled from a main lever and an auxiliary lever which is pivoted on the former and swingable around the pivot by a separate piston-cylinder assembly.

These and other objects of the invention will become more apparent from the following description taken in conjunction with the accompanying drawings, in which.

Figure 1:
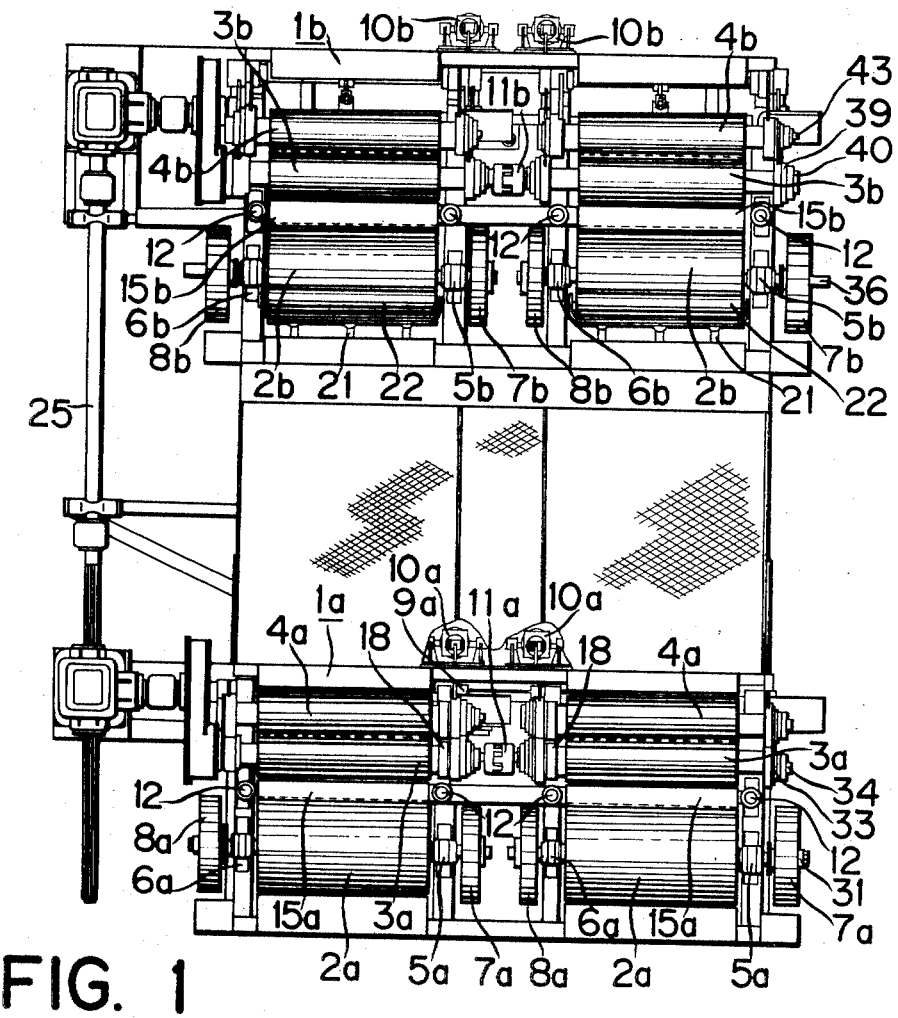
FIG. 1 is a plan view of a device for measuring the deceleration of vehicle wheels embodying this invention.
Figure 2:
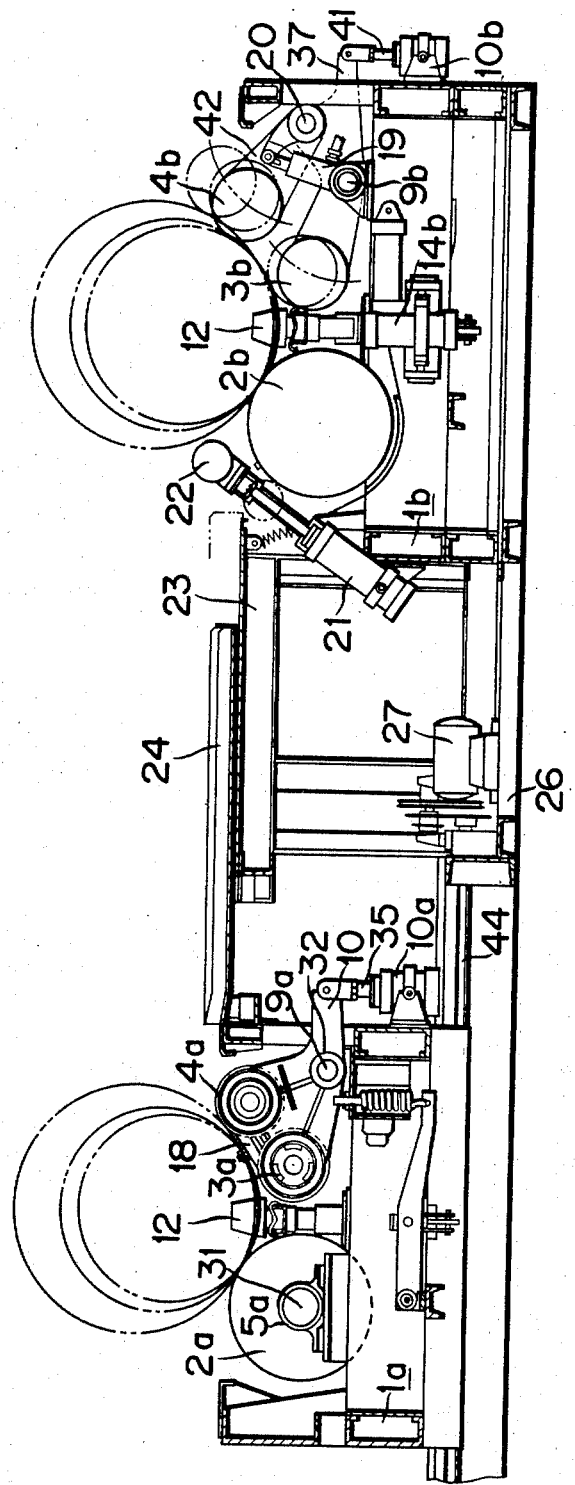
FIG. 2 is a sectional side view of the device of FIG. 1.

FIGS. 1 and 2 indicate a device for measuring the deceleration of the wheels of a four-wheeled car. The device is provided with a movable front frame 1a and a rear base frame 1b. One the front frame 1a are disposed two front rollers 2a for supporting the front wheels of the automobile which are coaxially aligned with each other and extending across the automobile body. Each of the front rollers 2a has end shafts 31 carried on bearings 5a and 6a respectively, the bearings being disposed on the front frame 1a. Fly-wheels 7a and 8a are respectively attached to the end of each shaft. Two first coaxial rollers 3a are arranged behind the front rollers in parallel thereto. The ends of the first rollers 3a facing each other are connected through a coupling joint 11a. Two second coaxial rollers 4a are arranged close behind the first rollers also in parallel to the front rollers.

All the aforementioned rollers are divided into two groups, each consisting of a front, a first and a second roller. The group is used in measuring variations in the wheel speed.

On the front frame, there are disposed four swinging levers or plates 10 divided into two groups corresponding to each set of the front, first and second rollers, all the levers 10 being rigidly secured to an axle 9a extending in parallel to the roller axis. The axle 9a is rotatably carried on bearings 32 mounted on the frame.

At the front end of each swinging lever 10 is provided a bearing 33 which carries a shaft 34 for the first roller. A piston-cylinder assembly 10a has a piston rod 35 connected to the rear end of either of the swinging levers in each of the aforesaid groups. The levers 10 are rotated by the motion of the piston rod so as to set the wheel on the front, first and second rollers in the prescribed position.

On the frame 1a, there are disposed four side rollers 12, each being shaped into a truncated cone and positioned behind the front rollers, so as to prevent the wheel from being displaced sidewise from the prescribed position.

On the rear frame 1b are disposed two front rollers 2b, two first coaxial rollers 3b and two second coaxial rollers 4b for supporting the rear wheels of the automobile in the same way as are the aforementioned front, first and second rollers. Each of the front rollers 2b has end shafts 36 carried on bearings 5b and 6b respectively, the bearings being disposed on the rear frame 1b. Fly-wheels 7b and 8b are respectively attached to the end of each shaft in the same way as are the aforesaid fly-wheels 7a and 8a. The ends of the first rollers 3b facing each other are connected through a coupling joint 11b. All the rollers 2b, 3b and 4b are divided into two groups in the same way as are the aforementioned rollers.

On the rear frame, there are disposed four swinging levers including main levers or plates 37 and auxiliary levers 42, said swinging levers being divided into two groups corresponding to each set of the front, first and second rollers on the rear frame 1b. All the main levers are rigidly secured to an axle 9b extending in parallel to the roller axle 36 mounted on the frame 1b.

At the front end of each main lever 37 is provided a bearing 39 which carries a shaft 40 for the first roller 3b. A piston-cylinder assembly 10b has a piston rod 41 connected to the rear end of either of the swinging levers in each of the aforesaid groups. An axle 20 is provided in a separate position on the lever 37. Around the axle 20 is rotatably mounted the auxiliary lever 42, at the front end of which there is disposed a shaft 43 for the second roller 4b. The auxiliary lever is capable of swinging around the axle 20 by the motion of a piston rod for a separate piston-cylinder assembly 19.

Four side rollers 12 of the truncated cone type are disposed in the same way as are the aforementioned side rollers in relation to the front frame 1a.

The front frame 1a is capable of moving lengthwise on a stationary base frame 26 by means of an electric motor 27 via a screw threaded system 44 so that the front and rear roller assemblies are spaced from each other in accordance with the axial distance of the automobile. Between the front and rear frame there are disposed a movable platform 24 and stationary platform 23 on the same level as are the front, first and second rollers. The movable platform is actuated by the movement of the front frame 1a. Brake mechanisms 18 are respectively disposed between the first and second rollers 3a and 4a so as to brake them when the automobile is set on or removed from the measuring device. Plate members indicated at 15a and 15b are vertically movable so as to act as guides when the automobile is operated.

Mounted at the front end of the rear frame are piston-cylinder assemblies 21, each having a supporting roller 22 mounted on the upper end of a piston rod for the assembly. The roller 22 acts as a barrier so as to prevent the wheel from riding on the front roller 2b during testing. When the automobile is set on or removed from the measuring device, the roller 22 is retracted to below the platform level. The first rollers 3a and 3b co-operate by gearing between the axes thereof via a transmitting mechanism such as a shaft and gears so as to transmit the rotation of the rear wheels of the automobile from the first roller on the rear frame to that on the front frame.

There is provided means for measuring the rotation of each of the second rollers 4a and 4b, such as a tachometer (not shown).

In operation, the four-wheel automobile is first set on the measuring device so as to support the wheels on the roller assemblies. Though the weight load of the automobile is applied on the roller assemblies in a manner to be equally spread over each of the roller assemblies, the first and second rollers are urged to the wheel by the clockwise rotation of the swinging lever (see FIGS. 2 and 3) caused by the retraction of the piston rod, so that these rollers are maintained on a suitable level.

Figure 3:
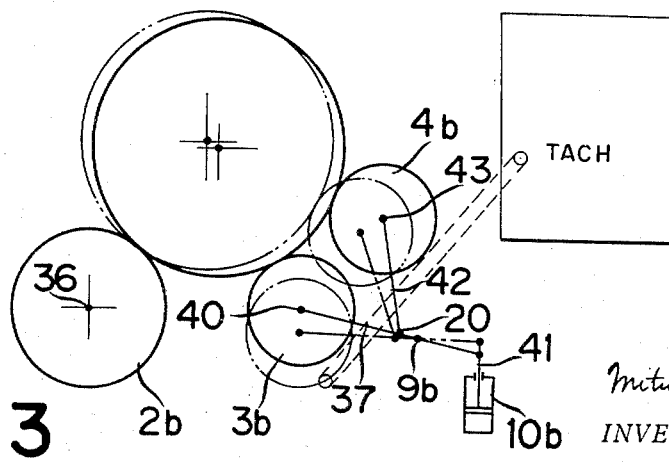
FIG. 3 is a diagram explaining the operation of the first and second rollers included in the device.

When measurement is to be made of an overall reduction in the rotation of all the automobile wheels caused by the braking load applied the first and second rollers 3b and 4b are positioned as indicated by solid lines in FIG. 3. The drive of the automobile engine causes the rotation of each wheel to be transmitted to the second roller. In this case, the mutual co-operation of the first rollers through the gear mechanism permits measurement of the overall reduction in the rotation of all the automobile wheels when braked, though not the reduced rotations of the individual wheels.

Measurement in the latter case is carried out by rotating the swinging lever anti-clockwise due to the withdrawal of the piston rod from the cylinder so as to remove the first rollers from the wheel and press the second rollers to the periphery thereof (as indicated by chain lines in FIG. 3). Thus each second roller is rotated at the same rate as each wheel.

The piston-cylinder assembly 19 is employed so as to cause the second roller to contact with the periphery of the wheel in the desired position, thus enabling the measuring device to be used with the various automobiles having wheels of different diameters.

In this arrangement, the contact of the second roller with the wheel is maintained by a forced pressure applied from the piston-cylinder assembly, regardless of the shifting of the wheel axle due to the rebounding motion of the tire and the vibration of the suspension system caused by brake shocks. Therefore, the varying rotations of the wheel caused by braking loads are continuously and exactly measured.

This arrangement may also be used in measuring the acceleration of the wheels and more particularly in measuring the starting acceleration or hill climbing ability of an automobile to be tested.

While the invention has been described in connection with some preferred embodiments thereof, the invention is not limited thereto and includes any modifications and alterations which fall within the true spirit and scope of the invention as defined in the appended claims.

What is claimed is:

1. A device for measuring braking effect on vehicle wheels, comprising in combination:
    (a) frame means including a front and a rear frame for mounting a vehicle thereon;
    (b) a pair of front rollers (2a, 2b) rotatably mounted on the front side of each of the front and rear frames (1a, 1b) or supporting the front and rear wheels of a vehicle, each pair being axially aligned and disposed to extend across the vehicle body;
    (c) two axially aligned first rollers (3a, 3b) disposed behind each pair of said front rollers and parallel thereto;
    (d) means mechanically connecting all of said first rollers for cojoint rotation;
    (e) two axially aligned independently rotatably second rollers (4a, 4b) arranged close behind said first rollers and parallel thereto;
    (f) piston cylinder means (10a, 10b) mounted on said frame coupled to said first and second rollers for simultaneously and resiliently pressing said first and second rollers to the periphery of a vehicle wheel for selectively retracting said first rollers from wheel contact; and
    (g) means for measuring the rotation of the first and second rollers, said first and second rollers when in contact with said wheels supporting a portion of the vehicle weight,
    whereby measurement of the overall reduction of wheel rotation under braking can be made when the first and second rollers are applied against the vehicle wheels and measurement of individual wheel speed reduction can be made when the first rollers are retracted.

2. A device according to claim 1 and further including motor means for adjusting the frame size to accommodate different vehicles by moving the front and rear frames with respect to each other.

References Cited

UNITED STATES PATENTS 1,612,928   1/1927   Langbein _____ 73—121

FOREIGN PATENTS 737,524   7/1943   Germany.
1,113,841   9/1961   Germany.

JAMES J. GILL, Primary Examiner